April 28, 1942.  T. F. COURTHOPE ET AL  2,281,140
APPARATUS FOR DISSOLVING ROCK SALT
Filed May 5, 1941  2 Sheets-Sheet 1
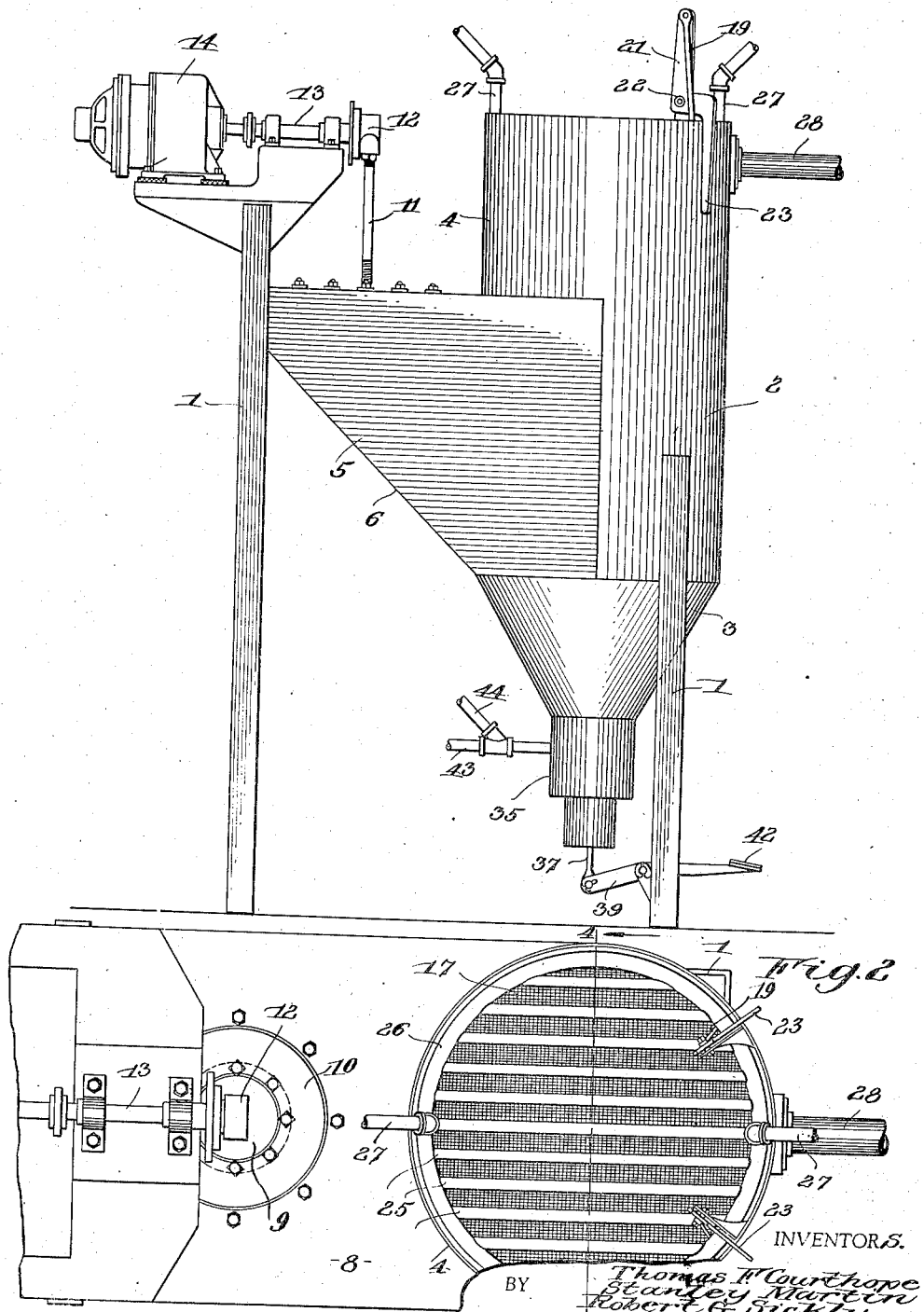

April 28, 1942.  T. F. COURTHOPE ET AL  2,281,140
APPARATUS FOR DISSOLVING ROCK SALT
Filed May 5, 1941  2 Sheets-Sheet 2
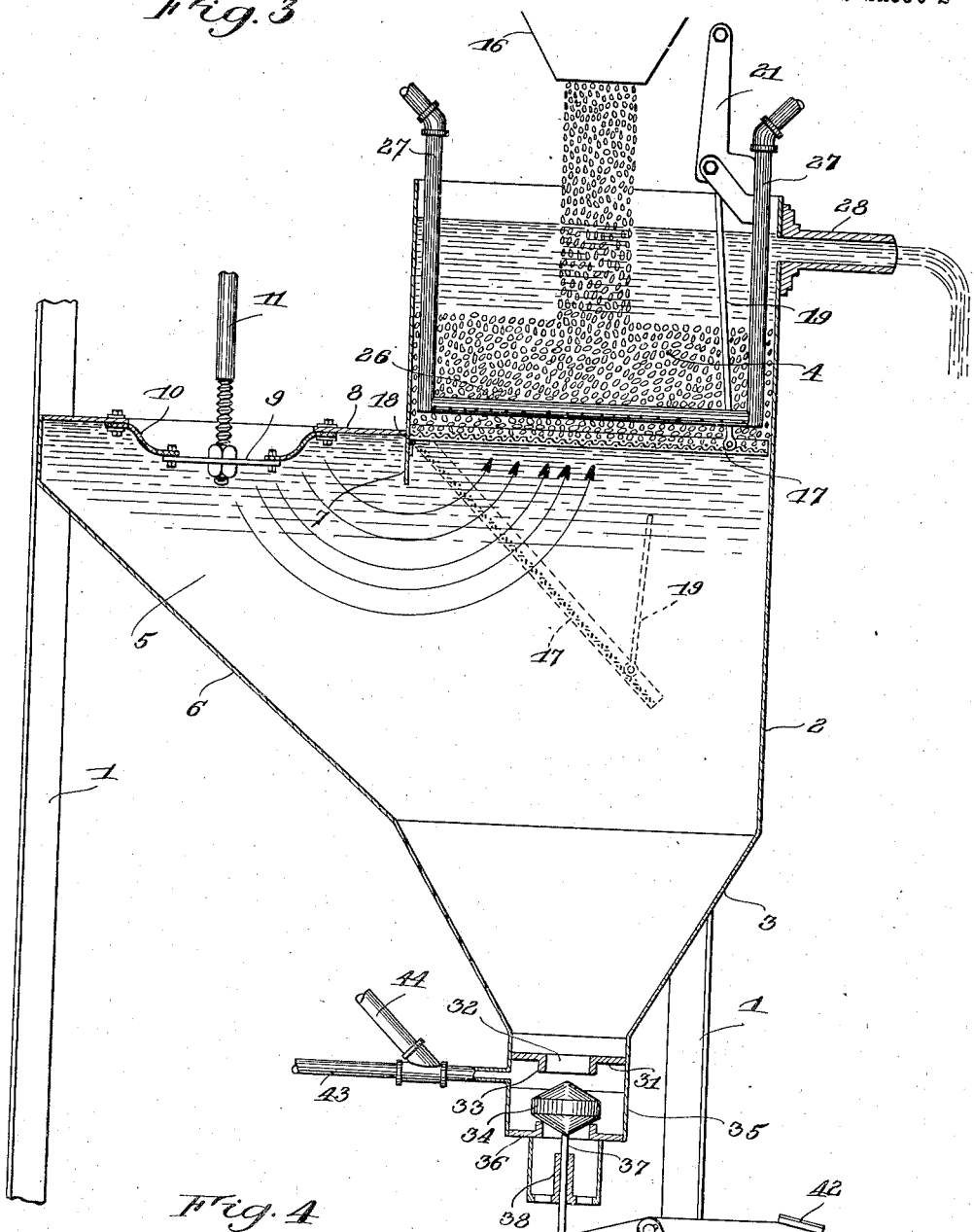
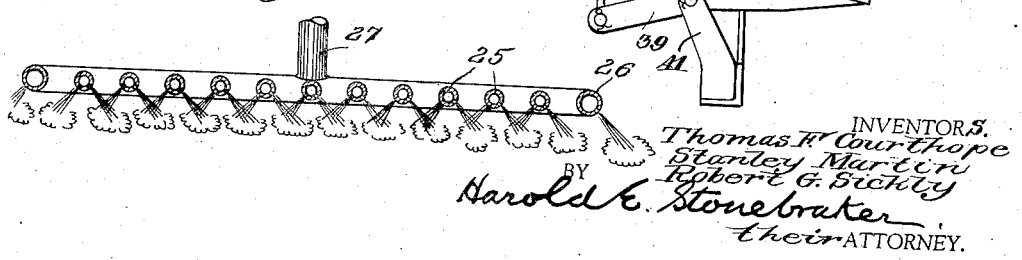

Patented Apr. 28, 1942

2,281,140

UNITED STATES PATENT OFFICE 2,281,140

APPARATUS FOR DISSOLVING ROCK SALT

Thomas F. Courthope, Geneseo, Stanley Martin, Retsof, and Robert G. Sickly, Geneseo, N. Y., assignors to International Salt Company, Retsof, N. Y., a corporation of New Jersey Application May 5, 1941, Serial No. 392,016

7 Claims. (Cl. 23—272)

This invention relates to a method and apparatus for dissolving rock salt or halite into brine, in a manner that will produce a fully saturated and substantially pure brine in a rapid manner and by a mechanism that can easily be controlled.

Rock salt as it comes from the mine usually contains calcium sulphate, shale, and other impurities in varying quantities, and it is a particular object of the invention to remove the calcium sulphate present in the rock salt by mechanical action during the process of dissolving it into brine, and thus avoid the cost and difficulty of chemically removing the calcium sulphate from the finished brine.

It is essential that calcium sulphate be removed from brine before the latter is used for the manufacture of various chemicals such as chlorine, hydrogen and caustic soda, since when brine is fed in an electrolytic cell, the life of the cell is directly related to the amount of impurities, particularly calcium sulphate, remaining in the cell after decomposition of the brine, and it it a further object of the invention to avoid the usual necessary chemical treatment of the brine by eliminating all but a negligible amount of the calcium sulphate from the brine during the salt dissolving operation.

More specifically, the invention has to do with a method and apparatus in which the salt is dissolved in a body of water that is pulsated through the salt, the latter being supported on a screen or other suitable instrumentality located above the bottom of the water, permitting the fine particles of calcium sulphate in the salt to move through the screen to the bottom of the body of water whence it can be removed at intervals, the coarser particles of shale being collected on and removed from the screen periodically, while the saturated brine is drawn off from a point above the body of salt near the top of the water.

Another purpose of the invention is to afford a construction by which this method can be effectively carried out with rock salt in a manner that effectively produces the necesary pulsation of the water through the salt in a generally vertical direction, while also affording a screen or other salt supporting instrumentality that can be suitably moved at intervals to remove the shale that collects thereon, and means for periodically removing the calcium sulphate and other impurities that collect at the bottom of the body of water beneath the supporting screen.

To these and other ends, the invention consists in the method and apparatus that will appear clearly from the following description when read in conjunction with the accompanying drawings, the novel features being pointed out in the claims following the specification.

In the drawings:

Fig. 1 is a view in side elevation of one commercial form of apparatus built in accordance with the invention and adapted for carrying out the method forming the subject matter thereof;

Fig. 2 is a plan view of the same;

Fig. 3 is a vertical sectional view taken centrally, and

Fig. 4 is a detail sectional view on the line 4—4 of Fig. 2 taken through the water discharge means, and indicating the direction of movement of the water as it enters the salt bed.

Referring more particularly to the drawings in which like reference numerals refer to the same parts throughout the several views, 1 designates legs or uprights of a supporting frame upon which is suitably mounted a tank preferably constructed of sheet metal and including a generally cylindrical portion affording a settling chamber 2 having a tapered bottom 3, a salt chamber 4 thereabove, and a pulsating chamber 5 arranged to one side of the settling chamber 2 and in communication therewith.

The pulsating chamber 5 has an inclined bottom 6 which merges into a portion of the tapered bottom 3 of the settling chamber 2, the latter being separated from the pulsating chamber 5 at the top by means of a depending deflecting wall or partition 7 which extends downwardly for a short distance as shown, for a purpose that will appear presently. The pulsating chamber 5 is closed at the top by means of the wall 8 having a central opening in which is arranged a vertically reciprocable diaphragm 9 connected to the surrounding top wall 8 by means of the annular rubber or other sealing flexible connection 10. 11 is a rod connected to the diaphragm 9 and also to an eccentric 12 that is operated by the shaft 13, the latter being driven through suitable gearing from the electric motor 14, which drives the shaft 12 at a suitable slow speed of for instance 70 R. P. M. to effect corresponding reciprocation of the rod 11 and diaphragm 9, and cause the necessary vertical pulsation of the water in the settling tank and salt chamber. As the water is pulsated downwardly in the pulsating chamber, the deflecting partition 7 causes movement of the water in a generally curved direction downwardly toward the settling chamber and thence vertically in the settling chamber through the screen and body of salt thereon.

The salt is fed into the machine continuously, in accordance with common practice in the art, from a hopper 16, and is supported in the chamber on a suitable instrumentality such as screen 17 which is of such mesh as to hold the undissolved salt as it is fed, prior to its dissolution into brine. The screen 17 which may have any suitably sized openings, depending upon the coarseness of the salt, is pivotally mounted at 18 and is held in its normal horizontal position supporting the salt, as shown in Fig. 3, by means of the rods 19 pivotally connected thereto and having their upper ends pivotally connected to levers 21, which are mounted at 22 on suitable stationary brackets and provided with operating handles 23. The arrangement is such that when the screen is in its horizontal position, as shown in Figs. 1 and 3, the supporting rods 20 are located in a vertical line slightly to the right of the pivotal centers 22 of the supporting levers 21, and when it is desired to dump the shale and impurities on the screen, the handles 23 are pulled outwardly, drawing the levers 21 inwardly and lowering the screen to the position shown in dotted lines in Fig. 3.

Water is fed to the apparatus from suitable water discharge means preferably located just above the screen 17 near the bottom of the body of salt, and comprising a series of parallel pipes 25 provided with oppositely arranged openings located to direct water downwardly at angles of approximately 45° to the horizontal, said pipes communicating with and surrounding a circular header pipe 26 preferably having a single set of openings discharging the water in one direction at a similar angle. 27 designates vertical water supply pipes connecting with the header 26 preferably on opposite sides thereof, water being fed to the inlet pipes 27 from any suitable source of supply, and 28 designates an outlet near the top of the salt chamber and through which the brine is carried off as a saturated salt solution with the calcium sulphate and other impurities completely or almost completely removed so as to require no subsequent chemical treatment.

At the bottom of the settling chamber is a baffle 31 provided with a central opening 32 and a seat 33 on its underside adapted to receive the double seat valve 34 which is movable in the valve chamber 35 and normally rests against the lower seat 36 to maintain the valve chamber closed. The valve 34 is mounted on a valve rod 37 movable in a supporting bearing 38 and pivotally connected to a lever 39 pivoted to the bracket 41 and operable by a treadle 42. 43 designates a water flushing pipe leading to the valve chamber 35 above the seat 36, while 44 is an air vent connected with the water inlet 43.

With the construction just described, as the fine particles of calcium sulphate and other impurities collect at the bottom of the settling chamber and within the valve chamber 35, the latter can be emptied at any desirable intervals during the operation of the machine and without shutting it down by moving the valve 34 upwardly into engagement with seat 33 to close the opening 32, and then by flushing water through the pipe 43, whatever sediment is collected in the valve chamber is quickly removed, whereupon the valve is released and falls by gravity to its initial position against the seat 36.

In the normal operation of the machine, with the settling chamber closed at the bottom, water is filled in the tank until the settling chamber and pulsating chamber are filled, and the water then fills in the salt chamber up to the brine outlet 28. Salt is thereupon fed from the hopper 16 in a suitable quantity, it being understood that water and salt are thus fed to the machine continuously in amounts that may be determined and controlled as the needs require.

The salt as it fills into the salt chamber is supported on the screen 17, and as the diaphragm 9 is reciprocated, it causes a movement of the water in the pulsating chamber downwardly around partition 7 and thence vertically through the screen 17, effecting a pulsating movement of the water upwardly and downwardly through the screen 17 and salt thereon and thus effecting a thorough separation of the calcium sulphate and other impurities which it contains.

As a result, the salt is steadily dissolved in the water, the resulting brine in a substantially pure state is drawn off steadily at the top through the outlet 28, the fine particles of calcium sulphate and other impurities drop through the screen 17 and settle to the bottom of the settling chamber 2, while the coarser particles of shale and other impurities are retained on the screen 17.

When there has been such a collection of shale on the screen 17 as to interfere with the proper operation of the mechanism, the supply of salt is stopped for the time, and the screen lowered to permit the shale collected thereon to be washed off and carried down to the bottom of the settling chamber, the latter being emptied at the bottom as often as required.

With this arrangement, a continuous dissolving action of the salt is had so that a saturated brine solution is carried off continually but without any appreciable quantity of calcium sulphate or other impurities, since the latter are either retained on the screen 17 or pass therethrough to the bottom of the settling tank. It is possible with this procedure to remove practically all the fine particles of calcium sulphate to the bottom of the settling chamber away from contact with the incoming salt, and the structure enables dissolving fresh salt into brine without its coming in contact with or being directly affected by the calcium sulphate removed from the previously processed salt, due to the vertical pulsating action of the water and salt and the upward flow of the water in its movement through the salt and outwardly as brine.

While the invention has been described with reference to a certain structural embodiment, the method and apparatus are not restricted to the specific details of construction herein disclosed, and this application is intended to cover such changes or departures as may come within the purposes of the invention or the scope of the following claims.

We claim:
1. A salt dissolving apparatus including a material-receiving chamber and a settling chamber therebeneath, a material supporting screen pivotally mounted at the bottom of the material-receiving chamber and above the settling chamber, water supply means comprising a series of discharge pipes horizontally disposed at the bottom of the body of material and above said screen and acting to discharge water downwardly, a brine outlet near the top of the material-receiving chamber, a pulsating chamber to one side of the settling chamber and in communication therewith, said pulsating chamber including an inclined bottom which merges into the bottom of the settling chamber, a vertical deflecting par- tition located between the settling chamber and pulsating chamber and extending downwardly from the top thereof for a short distance, the pulsating chamber being closed at the top, a vertically reciprocable diaphragm arranged in the top of said pulsating chamber, means at the bottom of the settling chamber permitting removal therefrom of fine particles of settled material, and means connected to said screen for lowering the same to permit coarse particles of settled material lodged thereon to gravitate downwardly into the settling chamber.

2. A salt dissolving apparatus including a material-receiving chamber and a settling chamber therebeneath, a material supporting screen in the material-receiving chamber above the settling chamber, means for introducing water above the material-supporting screen, a brine outlet near the top of the material-receiving chamber, means at the bottom of the settling chamber permitting removal of settled material therefrom, a water pulsating chamber offset horizontally from the settling chamber and communicating with the upper part of the settling chamber at a point above the bottom thereof, and water pulsating means located in the pulsating chamber and acting to effect a pulsating movement of the water in the upper part of the settling chamber upwardly through said screen and body of material.

3. A salt dissolving apparatus including a material-receiving chamber and a settling chamber therebeneath, a material supporting screen in the material-receiving chamber above the settling chamber, a means for introducing water above the material-supporting screen, brine outlet near the top of the material-receiving chamber, means at the bottom of the settling chamber permitting removal of settled material therefrom, a water pulsating chamber communicating with the upper part of the settling chamber, and water pulsating means located in the pulsating chamber and acting to effect a pulsating movement of the water in the upper part of the settling chamber upwardly through said screen and body of material.

4. A salt dissolving apparatus including a material-receiving chamber and a settling chamber therebeneath, a material supporting screen mounted at the bottom of the material-receiving chamber and above the settling chamber, water supply means located somewhat above the screen and acting to discharge water downwardly, a brine outlet near the top of the material-receiving chamber, a pulsating chamber located to one side of the settling chamber above the lower part thereof and in communication with the upper part of the settling chamber above the bottom thereof, the pulsating chamber being closed at the top, a vertically reciprocable diaphragm arranged in the top of said pulsating chamber, and means at the bottom of the settling chamber permitting removal therefrom of settled material, the water and settled material at the bottom of the settling chamber being undisturbed by the pulsating movement of the water in the pulsating chamber and upper part of the settling chamber.

5. A salt dissolving apparatus including a material-receiving chamber and a settling chamber therebeneath, a material supporting screen mounted at the bottom of the material-receiving chamber and above the settling chamber, water supply means located somewhat above the screen and acting to discharge water downwardly, a brine outlet near the top of the material-receiving chamber, a pulsating chamber located to one side of the settling chamber above the lower part thereof and in communication with the upper part of the settling chamber above the bottom thereof, the pulsating chamber being closed at the top, pulsating means acting upon the water in the pulsating chamber, and means at the bottom of the settling chamber permitting removal therefrom of settled material, the water and settled material at the bottom of the settling chamber being undisturbed by the pulsating movement of the water in the pulsating chamber and upper part of the settling chamber.

6. A salt dissolving apparatus including a material-receiving chamber and a settling chamber therebeneath, a material-supporting screen located at the bottom of the material-receiving chamber and above the settling chamber, means for introducing water above the material-supporting screen, a brine outlet near the top of the material-receiving chamber, means at the bottom of the settling chamber permitting removal of settled material therefrom, a pulsating chamber located to one side of the settling chamber above the lower part thereof and communicating with the upper part of the settling chamber, water pulsating means in the pulsating chamber controlling the water in the upper part of the settling chamber and in the material-receiving chamber and operating to effect a pulsating movement of said water upwardly through said screen and body of material, the water and settled material at the bottom of the settling chamber being undisturbed by the water pulsating means.

7. A salt dissolving apparatus including a material-receiving chamber and a settling chamber therebeneath, a material-supporting screen located at the bottom of the material-receiving chamber and above the settling chamber, means for introducing water downwardly of the material at a point near the bottom thereof and above said screen, a brine outlet near the top of the material-receiving chamber, a pulsating chamber located to one side of the settling chamber above the lower part thereof and communicating with the upper part of the settling chamber, said pulsating chamber being closed at the top and provided in said closed top with a reciprocable diaphragm which acts to effect a pulsating action of the water in the pulsating chamber, in the upper part of the settling chamber, and upwardly through said screen and the body of material, and means located at the bottom of the settling chamber permitting removal of settled material therefrom, the water and settled material at the bottom of the settling chamber being undisturbed by the water pulsating means.

THOMAS F. COURTHOPE.
STANLEY MARTIN.
ROBERT G. SICKLY.